Aug. 22, 1933.  F. L. KNEELAND  1,923,627
FLEXIBLE POST FILE BINDER
Filed Sept. 16, 1932
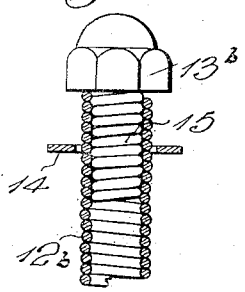
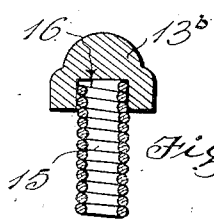
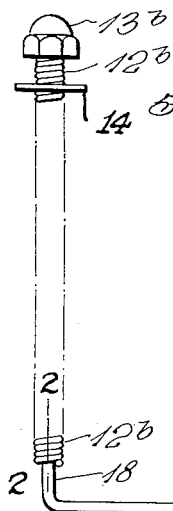
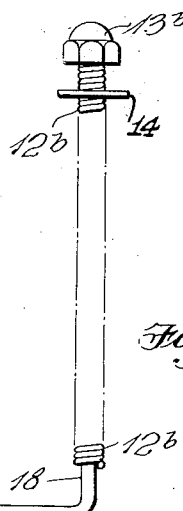
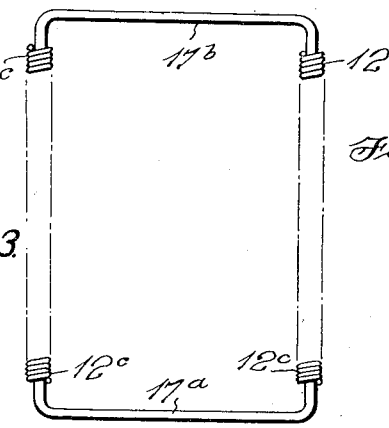
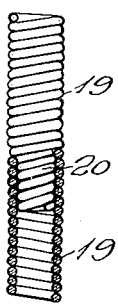
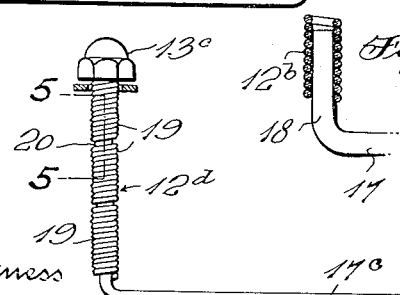
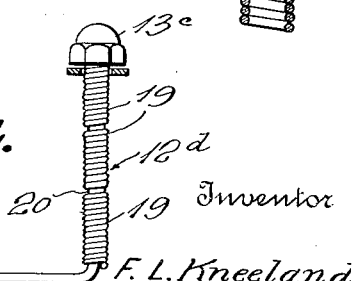
Inventor
F. L. Kneeland Patented Aug. 22, 1933

1,923,627

UNITED STATES PATENT OFFICE 1,923,627

FLEXIBLE POST FILE BINDER

Frederick L. Kneeland, Olympia, Wash.

Application September 16, 1932
Serial No. 633,509

2 Claims. (Cl. 129—23)

The invention relates to file binders including coil springs for passage through a plurality of papers or other sheets or the like, and it aims to provide a new and improved binder of this type, which will be exceptionally simple and inexpensive, yet convenient and efficient.

With the foregoing in view, the invention resides in the novel subject matter hereinafter described and claimed, description being accomplished by reference to the accompanying drawing.

Fig. 1 is a side elevation showing one form of construction.

Fig. 2 is a detail sectional view on line 2—2 of Fig. 1.

Fig. 3 is a side elevation illustrating a modified form of construction.

Fig. 4 is a side elevation of a form of the device in which the springs are of sectional construction.

Fig. 5 is a detail sectional view partly in elevation, on line 5—5 of Fig. 4.

Fig. 6 is a detail sectional view partly in elevation showing the manner of removably connecting the abutments 13$^b$ with the springs 12$^b$.

Fig. 7 is a detail sectional view showing the manner of connecting an attaching shank 15 with each abutment 13$^b$.

In Figs. 1 and 2, two springs 12$^b$ are employed, having abutments 13$^b$ of any desired form, detachably connected therewith. These abutments may be of any desired form and connected in any preferred way with the springs 12$^b$, but in the construction shown, each abutment 13$^b$ is provided with a coiled shank 15 secured in a socket 16 in said abutment, said coiled shank being threaded into the spring 12$^b$ (see Figs. 6 and 7). Washers 14 preferably underlie the abutments 13$^b$.

At the ends of the springs 12$^b$ remote from the abutments 13$^b$, a U-shaped wire abutment 17 is provided, having its ends 18 inserted into and frictionally held by said springs. This form of the device is well adaptable for a working file or a transfer file, due to the quick detachability and attachability of the abutments 13$^b$.

In Fig. 3, the ends of two U-shaped wire abutments 17$^a$ and 17$^b$ are inserted into and held by the ends of two coil springs 12$^c$. The abutments and springs may not as conveniently be separated from each other as when abutments such as 13$^b$ are used, and this form of construction is therefore adaptable primarily for use with permanent files.

In Fig. 4, two coil springs 12$^d$ are employed, said springs being connected by a U-shaped wire abutment 17$^c$ whose ends are received in and held by said springs. Removable abutments 13$^c$ identical with the abutments 13$^b$ are provided on the other ends of the springs.

Each spring 12$^d$ is composed of a plurality of sections 19, each formed from a short coil spring. All of these sections except those connected with the ends of the abutment 17$^c$ are provided with reduced ends 20, and the reduced end of any section is threaded into the next adjacent section. This provides a construction in which the springs or posts may be increased or decreased in length, as desired, and hence, this form of the device is unusually desirable as a working file, for the springs or posts may be increased in length as the package of papers increases in thickness.

In the foregoing, I have disclosed a number of forms of construction well adapted for the intended purposes, but it will be understood that within the scope of the invention as claimed, variations may be made. Moreover, the devices may be constructed of any appropriate materials and in any desired sizes.

I claim:—

1. A file binder comprising two parallel coiled springs for passage through openings in a plurality of sheets, a U-shaped wire abutment having one of its ends inserted into and held by the lower end of one of said springs, and its other end inserted into and held by the lower end of the other of said springs, and abutment means removably engaged with the upper ends of the two springs.

2. A file binder comprising two parallel coiled springs for passage through openings in a plurality of sheets, a U-shaped wire abutment having one of its ends inserted into and held by one end of one of said springs, and its other end inserted into and held by one end of the other of said springs, and a second U-shaped wire abutment having its ends inserted into and held by the other ends of said springs.

FREDERICK L. KNEELAND.